Figure 3:
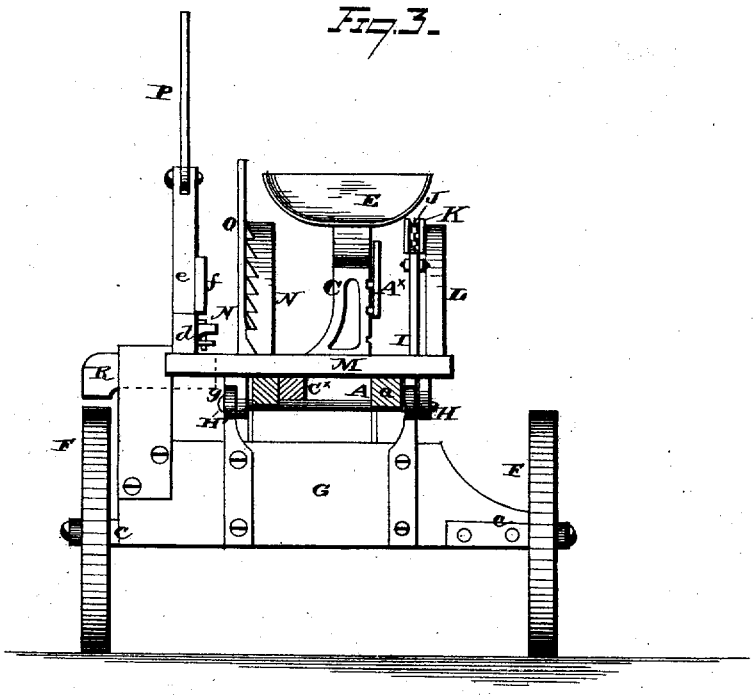

BEST AVAILABLE COPY
F. S DAVENPORT,
Assignor to R. NEWTON.
Gang-Plow.
No. 8,986. Reissued Dec. 2, 1879.
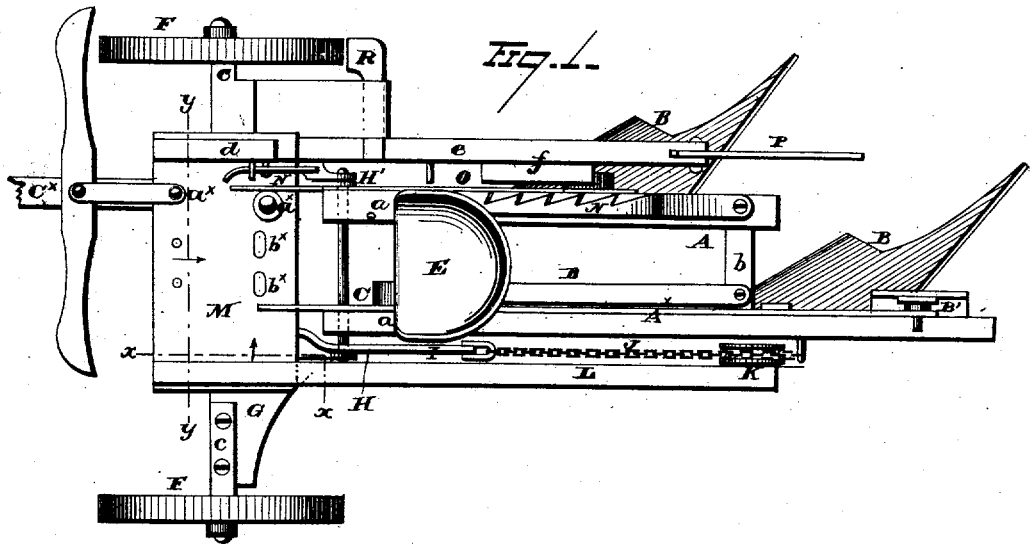
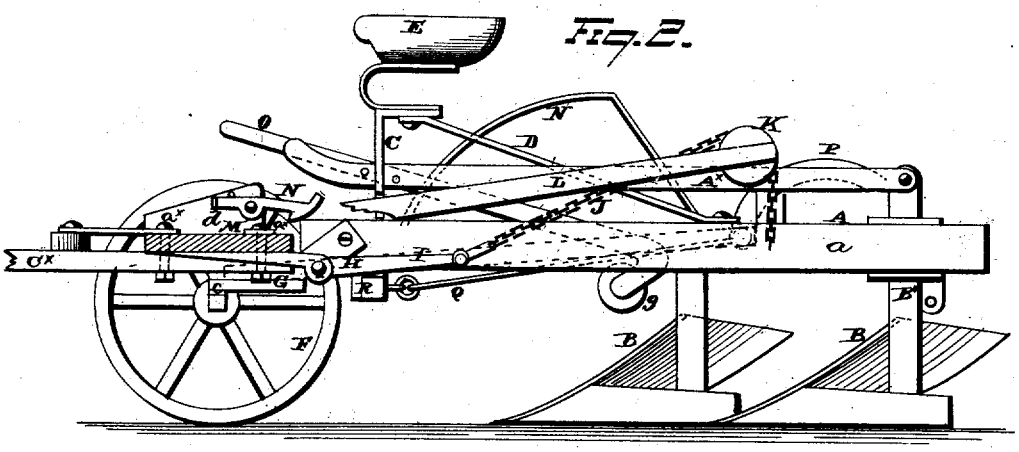
WITNESSES
E. L. Nottingham
A. M. Bright
INVENTOR
F. S. Davenport.
By Duggett & Duggett.
ATTORNEY
N. PETERS, PHOTO-LITHOGRAPHER, WASHINGTON, D. C.

2 Sheets—Sheet 2.

F. S DAVENPORT,

Assignor to R. NEWTON.

Gang-Plow.

No. 8,986. Reissued Dec. 2, 1879.

WITNESSES

S. J. Nottingham

A. M. Bright.

INVENTOR

F. S Davenport.

By Duggett & Duggett

ATTORNEYS.

N. PETERS, PHOTO-LITHOGRAPHER, WASHINGTON, D. C.

UNITED STATES PATENT OFFICE.

FREDERICK S. DAVENPORT, OF JERSEYVILLE, ILLINOIS, ASSIGNOR TO ROBERT NEWTON.

IMPROVEMENT IN GANG-PLOWS.

Specification forming part of Letters Patent No. 58,612, dated October 9, 1866; Reissue No. 8,986, dated December 2, 1879; application filed October 15, 1879.

*To all whom it may concern:*

Be it known that I, F. S. DAVENPORT, of Jerseyville, Jersey county, and State of Illinois, have invented a new and Improved Wheel-Plow; and I do hereby declare that the following is a full, clear, and exact description thereof, which will enable others skilled in the art to make and use the same, reference being had to the accompanying drawings, forming part of this specification.

The object of my invention is to provide improved means for utilizing the draft of the team in raising a plow from the ground; and to this end my invention consists, first, in the combination, with a swing-axle and ground or carrying wheel, of friction-clutch mechanism and means for engaging and disengaging the latter with the ground or carrying wheel, said parts being constructed and adapted to raise the plow by locking the swing-axle to the carrying-wheel by friction-clutch engagement, and raise the plow-beam by the draft or power of the team; second, in the combination, with a ground-wheel, a swing-axle, and a plow-beam connected to the latter, of clutch mechanism connected to the axle and adapted by engagement with the wheel to utilize the draft of the team in turning the swing-axle into upright position, and thereby raise the plow-beam; third, in the combination, with a ground-wheel, a swing-axle, and a plow-beam connected to the latter, of a friction-clutch connected to the axle and adapted, by contact with the wheel, to turn the axle into upright position, and thereby raise the plow-beam by the aid of the draft of the team.

Referring to the drawings, Figure 1 is a plan or top view of my invention. Fig. 2 is a side view of the same, partly in section, as indicated by the line *x x*, Fig. 1. Fig. 3 is a transverse vertical section of the same, taken in the line *y y*, Fig. 1.

Similar letters of reference indicate like parts.

This machine consists of a frame, A, made of two parallel beams or bars, *a a*, braced together near the front and back pieces *b b*. From each of these beams or bars depends a plow, B.

To the front cross-piece is bolted an iron standard, C, strengthened by an iron stay, D, running down to the back cross-piece. To the top of the standard C is attached a spring-seat, E, the whole supported upon two wheels, F F, each turning upon a journal, *c*, of a swing-axle, G.

It will be observed that one of the journals *c* is attached to the front or upper side of the swing-axle G, and the other to the back or under side, in such a manner that when it is turned down in a horizontal position to lower the plows to the ground the wheel that runs in the furrow will be as much lower than the other as the depth of the furrow may require. The journal that carries the wheel that runs in the furrow is so formed that it may be removed from the back of the swing-axle and be secured to the front, so that the machine may run level when there is no furrow for the wheel to run in, as is the case when preparing the ground for cotton-seed.

The swing-axle G is attached to the plow-frame by two iron hinges, H H′, the one H on the side of the long beam forming an arm or lever, I, to which is attached a chain, J, which passes over a wheel, K, and is made fast to the plow-frame. The wheel K turns upon a stud in the end of a lever, L, this lever being bolted to the foot-board M, which is hinged to the plow-frame in the same manner and at the same place as the axle G. To the opposite end of the foot-board is bolted a bracket or stop, *d*, against which rests an arm, *e*, by which the swing-axle G is operated, the arm *e* being held in the vertical position by a latch, N, which is lifted by placing the foot on the back part of it.

Now it will be seen that to lower the plow to the ground it is only necessary to bring down the arm *e* till a block, *f*, which is bolted to its side, rests upon a stop, *g*, of a lever, O, which is secured in the required position by a notched quadrant, N.

It will be observed that as the lever O is moved forward from notch to notch the plows will cut deeper and deeper, and the reverse as it is drawn back. By these details the driver has entire control of the depth of the furrow without moving from his seat or stopping the machine.

Through a mortise in the top of arm *e* passes a small iron lever, P, to which is attached a rod, Q, connecting it with a brake, R, which acts upon one of the wheels F, the brake R working upon a pin fixed in a block of wood or an iron plate fastened to the front side of the swing-axle G.

The object of this brake is to facilitate the operation of lifting the plows out of the ground when the machine is moving forward, for by applying but a little force to the lever P the brake is pressed sufficiently hard to the wheel to turn the swing-axle to the vertical position.

The draft-pole or tongue $C^{\times}$ is fastened to the under side of the foot-board M by two bolts, $a^{\times}$, a number of holes being made, so that that the tongue may be moved to the right or left to give the required land to the plows. The back holes $b^{\times}$ are made as oblong slots, so that the tongue can be slanted when needed. The tongue may, if necessary, be used on either side of the draft-line, and the double-tree attached to the foot-board independent of the tongue. This arrangement is chiefly for the convenience of using three horses abreast.

When the swing-axle G is turned down in the horizontal position the lever or arm I gives the chain J, which is attached to it, considerable slack, allowing the tongue to move up and down without influencing the plows, constituting what is commonly called a "limber tongue."

In regard to raising the plows out of the ground, it will be observed that the front part of the machine is lifted nearly two-thirds of its course before the lever I tightens the chain and commences to lift the back part. This contrivance produces an easy motion without causing either jerk or strain upon the horses or the machine.

The hind plow can be raised or lowered independent of the other, the standard B′ sliding in an iron block, $O^{\times}$, and operated by a lever, $A^{\times}$, extending forward to the front of the seat and secured in the required position by notches in the side of the seat-standard, as shown in Fig. 3.

Having fully described my invention, what I claim as new, and desire to secure by Letters Patent, is—

1. In a wheel-plow, the combination, with a swing-axle and ground or carrying wheel, of friction-clutch mechanism and means for engaging and disengaging the latter with the ground or carrying wheel, said parts being constructed and adapted to raise the plow by locking the swing-axle to the carrying-wheel by friction-clutch engagement, and raise the plow-beam by the draft or power of the team, substantially as set forth.

2. In a wheel-plow, the combination, with a ground-wheel, a swing-axle, and a plow-beam connected to the latter, of clutch mechanism connected to the axle and adapted, by engagement with the wheel, to utilize the draft of the team in turning the swing-axle into upright position, and thereby raise the plow-beam, substantially as set forth.

3. In a wheel-plow, the combination, with a ground-wheel, a swing-axle, and a plow-beam connected to the latter, of a friction-clutch connected to the axle and adapted, by contact with the wheel, to turn the axle into upright position, and thereby raise the plow-beam by aid of the draft of the team, substantially as set forth.

In testimony that I claim the foregoing I have hereunto set my hand this 1st day of October, 1879.

FREDERICK S. DAVENPORT.

Witnesses:

HENRY D. FIELD,

WILLIAM FORD.